(12) United States Patent
Abrams (10) Patent No.: US 7,178,165 B2
(45) Date of Patent: Feb. 13, 2007

(54) ADDITIONAL LAYER IN OPERATING SYSTEM TO PROTECT SYSTEM FROM HACKING

(75) Inventor: Roger Kenneth Abrams, Raleigh, NC (US)

(73) Assignee: Lenovo (Signapore) Pte Ltd., New Tech Park (SG)

( * ) Notice: Subject to any disclaimer, the term of this patent is extended or adjusted under 35 U.S.C. 154(b) by 1079 days.

(21) Appl. No.: 09/933,237

(22) Filed: Aug. 20, 2001

(65) Prior Publication Data

US 2003/0037252 A1 Feb. 20, 2003

(51) Int. Cl.
*G06F 11/30* (2006.01)
*H04L 9/00* (2006.01)
*H04L 9/32* (2006.01)

(52) U.S. Cl. .............................. 726/23; 726/4; 713/164; 713/167

(58) Field of Classification Search ................ 713/200, 713/201, 164; 395/187.9; 726/23
See application file for complete search history.

(56) References Cited

U.S. PATENT DOCUMENTS

| | | | |
|---|---|---|---|
| 5,418,956 A * | 5/1995 | Willman | 711/206 |
| 5,699,513 A | 12/1997 | Feigen et al. | 395/187.01 |
| 5,826,014 A | 10/1998 | Coley et al. | 395/187.01 |
| 5,828,833 A | 10/1998 | Belville et al. | 395/187.01 |
| 5,968,176 A | 10/1999 | Nessett et al. | 713/201 |
| 6,754,736 B1 * | 6/2004 | Ogawa et al. | 710/39 |

* cited by examiner

*Primary Examiner*—Kambiz Zand
(74) *Attorney, Agent, or Firm*—Robert A. Voigt, Jr.; Winstead Sechrest & Minick P.C.

(57) ABSTRACT

A method, system and computer program product for preventing at least in part a hacker from performing unwanted activities such as in a file system. A security layer may be added in the kernel space configured to determine whether a request to provide a service from a particular user was received from user space or kernel space. If the request was received from user space, then the user is an unauthenticated user. That is, the user may be a potential hacker. Subsequently, the security layer may determine whether the request satisfies requirements for unauthenticated requests. If the request was received from a secure connection manager in kernel space then the user may be treated as an authenticated user. The secure connection manager may be configured to establish a secure authorized connection with an authenticated user. Subsequently, the security layer may determine whether the request satisfies requirements for authenticated requests.

27 Claims, 6 Drawing Sheets

ADDITIONAL LAYER IN OPERATING SYSTEM TO PROTECT SYSTEM FROM HACKING

TECHNICAL FIELD

The present invention relates to the field of computer network security, and more particularly to preventing at least in part a hacker from performing unwanted activities such as in a computer's file system even if the hacker procures system administrator status without preventing authorized system administrators from performing authorized activities.

BACKGROUND INFORMATION

Security for a computer network refers to preventing network users, and particularly undesirable users hereinafter referred to as hackers, from engaging in unwanted activities with respect to computers or peripheral devices on the network. However, public networks are in place to provide various services for users who may need such services. Thus, network security involves an often complicated structure and/or technique for allowing certain users to use certain services while denying services to hackers.

The Internet is a well-known example of a public network providing services for users. Users may be linked to the Internet through a protocol commonly referred to as the World Wide Web (WWW). With the World Wide Web, an entity having a domain name may create a "web page" or "page" that can provide information and to a limited degree some interactivity.

A computer user may "browse", i.e., navigate around, the WWW by utilizing a suitable web browser, e.g., Netscape™, Internet Explorer™, and a network gateway, e.g., Internet Service Provider (ISP). A web browser allows the user to specify or search for a web page on the WWW and subsequently retrieve and display web pages on the user's computer screen such web browsers are typically installed on personal computers or workstations to provide web client services, but increasingly may be found on wireless devices such as cell phones.

The Internet is based upon a suite of communication protocols known as Transmission Control Protocol/Internet Protocol (TCP/IP) which sends packets of data between a host machine, e.g., server computer on the Internet commonly referred to as web server, and a client machine, e.g., a user's computer connected to the Internet. The WWW is an Internet interface protocol which is supported by the same TCP/IP transmission protocol for the communication of document files typically formatted in a markup language, such as the Hypertext Markup Language (HTML).

Typically, servers, e.g., web servers, comprise a file system. A file system may refer to a collection of management structures which impose a logical structure upon a storage device, typically a disk storage device, in order to construct and store files of data. For example, these files may store data used to construct web pages.

A hacker may access these files on the server and hence perform unwanted activities, e.g., deface web pages, despite various security systems. A hacker may somehow subvert security systems on the server and obtain system administrator status. Upon obtaining system administrator status, the hacker may instantiate a command shell, i.e., a command line interface, by establishing a network connection with the server. The command shell may be an application in user space. Memory space in a server may be logically divided into user space and kernel space. User space may refer to that portion of memory space accessible by users. For example, user space may include user applications, e.g., command shells, word processing, spreadsheet. Kernel space may refer to that logical portion of the memory space including the operating system. That is, the kernel space may typically include the core portions of the software that performs the most essential operating system tasks, e.g., handling disk input and output operations, managing internal memory, etc.

Upon instantiating a command shell, the hacker with system administrator status may then issue a request to the kernel space to perform unwanted activities, e.g., erase files, reading files containing credit card numbers, in the file system maintained in the kernel space. For example, the hacker may issue a request to download particular software, e.g., A Trojan program, on the server's machine, to perform any conceivable type of destruction. The term Trojan program may be used to describe software that masquerades as a useful or interesting application, but that will, if loaded onto the server, perform some type of destructive or unwanted function. For example, a Trojan program may be designed to erase files, to write over existing files with information supplied by the Trojan program, to locate particular files and forward them out into the Internet, and so forth.

An implementation for preventing a hacker from performing unwanted activities by accessing the user space in a computer is by an interface to the kernel space called capabilities that allows certain capabilities of the operating system to be deactivated. The capability that is deactivated may not be reactivated except by rebooting the system. For example, the capability interface may render the file system containing web pages read-only thereby preventing the hacker from performing unwanted activities on the file system. However, even authorized system administrators will not be able to implement ordinary, routine changes unless the system is rebooted thereby causing unacceptable system downtime.

It would therefore be desirable to prevent at least in part a hacker from performing unwanted activities such as in a computer's file system even if the hacker procures system administrator status without preventing authorized system administrators from performing authorized activities.

SUMMARY

The problems outlined above may at least in part be solved in some embodiments by adding a security layer in the kernel space. The security layer may then prevent at least in part requests to perform unwanted activities, e.g., erase files, reading files containing credit card numbers, such as in a file system from unauthenticated users.

In one embodiment, a method for preventing at least in part a hacker from performing unwanted activities, e.g., erase files, reading files containing credit card numbers, such as in a file system may comprise the step of a security layer in kernel space receiving a request to provide a service from a particular user. The security layer may determine whether the request was received from user space or kernel space. If the request was received from user space, then the user is an unauthenticated user. That is, the user may be a potential hacker. Subsequently, the security layer may determine whether the request satisfies requirements for unauthenticated requests, i.e., requests from an unauthenticated user. If the request does not satisfy requirements for unauthenticated requests, then the security layer does not service the request.

If the request does satisfy requirements for unauthenticated requests, then the security layer services the request.

If the request was received from kernel space then the security layer may determine whether the request was transmitted from a secure connection manager in the kernel space. The secure connection manager may be configured to establish a secure authorized connection with an authenticated user. If the request received from kernel space was not transmitted from the secure connection manager, then the user that transmitted the request may be treated as an unauthenticated user. If the request received from kernel space was transmitted from the secure connection manager, then the user is an authenticated user. Subsequently, the security layer may determine whether the request satisfies requirements for authenticated requests, i.e., requests from an authenticated user. If the request does not satisfy requirements for authenticated requests, then the security layer does not service the request. If the request does satisfy requirements for authenticated requests, then the security layer services the request.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
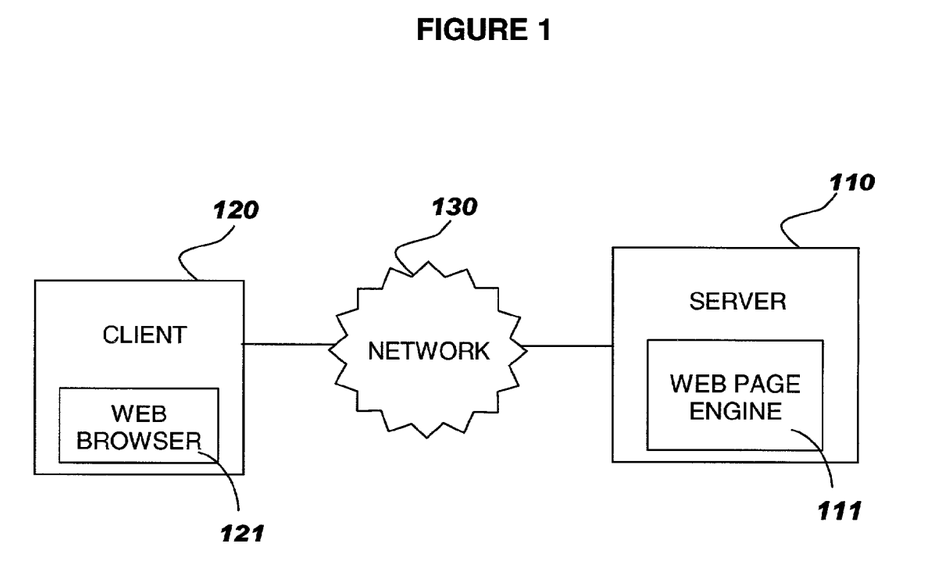
FIG. 1 illustrates a network system configured in accordance with the present invention.

FIG. 1—Network System

FIG. 1 illustrates an embodiment of the present invention of a network system 100. Network system 100 may comprise a server 110 connected to a client 120 via a network 130. Network 130 may be a Local Area Network (LAN), e.g., Ethernet, Token Ring, ARCnet, or a Wide Area Network (WAN), e.g., Internet. It is noted that the Internet may refer to a network of computers. It is further noted that the connection between client 120 and server 110 may be any medium type, e.g., wireless, wired. It is further noted that client 120 may be any type of device, e.g., wireless, Personal Digital Assistant (PDA), cell phone, personal computer system, workstation, Internet appliance, configured with the capability of connecting to network 130 and consequently communicating with server 110. It is further noted that network system 100 may be any type of system that has at least one server and at least one client and that FIG. 1 is not to be limited in scope to any one particular embodiment Server 110 may comprise a web page engine 111 for maintaining and providing access to an Internet web page which is enabled to forward a Hyper-Text Mark-up Language (HTML) file to a web browser 121 of client 120. Web browser 121 may be configured for reading and interpreting web pages. While the illustrated client engine is a web browser 121, those skilled in the art will recognize that other client engines may be used in accordance with the present invention.

Figure 2:
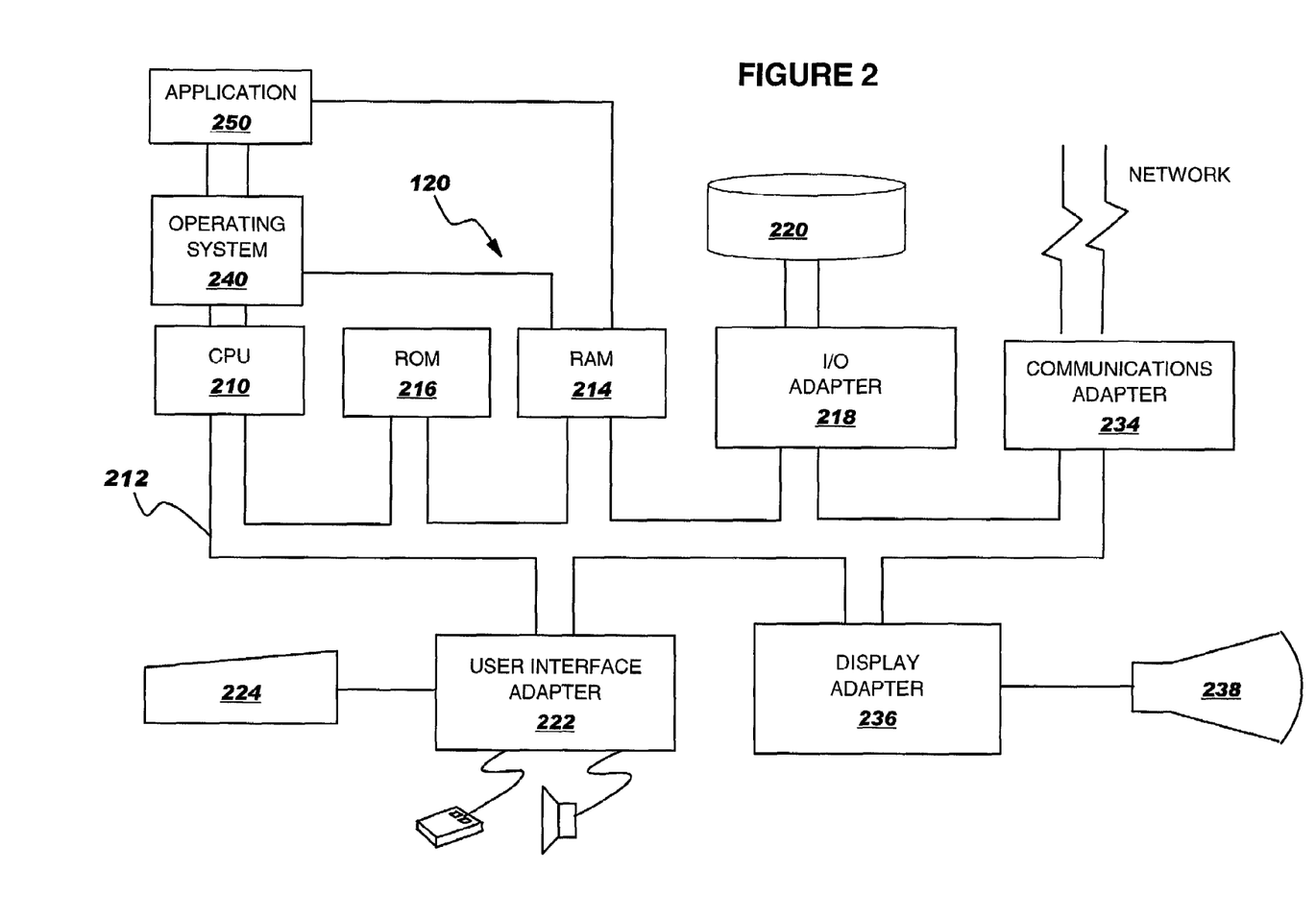
FIG. 2 illustrates an embodiment of the present invention of a client in a network system.

FIG. 2—Hardware Configuration of Client

FIG. 2 illustrates a typical hardware configuration of client 120 which is representative of a hardware environment for practicing the present invention. While the description below describes the internal connections in client 120 as hard wired it is understood by a person of ordinary skill that the connections may be wireless. Client 120 has a central processing unit (CPU) 210 coupled to various other components by system bus 212. An operating system 240 runs on CPU 210 and provides control and coordinates the function of the various components of FIG. 2. An application 250 in accordance with the principles of the present invention runs in conjunction with operating system 240 and provides output calls to operating system 240 where the output calls implement the various functions or services to be performed by application 250. Application 250 may include for example, web browser 121. Read only memory (ROM) 216 is coupled to system bus 212 and includes a basic input/output system ("BIOS") that controls certain basic functions of client 120. Random access memory (RAM) 214, I/O adapter 218, and communications adapter 234 are also coupled to system bus 212. It should be noted that software components including operating system 240 and application 250 are loaded into RAM 214 which is the computer system's main memory. I/O adapter 218 may be an integrated drive electronics ("IDE")adapter that communicates with unit 220, e.g., disk drive.

Communications adapter 234 interconnects bus 212 with network 130 enabling client 120 to communicate with server 110. Input/output devices are also connected to system bus 212 via user interface adapter 222 and display adapter 236. Keyboard 224, mouse 226 and speaker 230 are all interconnected to bus 212 through user interface adapter 222. Event data may be input to client 120 through any of these devices. A display monitor 238 is connected to system bus 212 by display adapter 236. In this manner, a user is capable of inputting to client 120 through keyboard 224 or mouse 226 and receiving output from client 120 via display 238 or speaker 230.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change.

Figure 3:
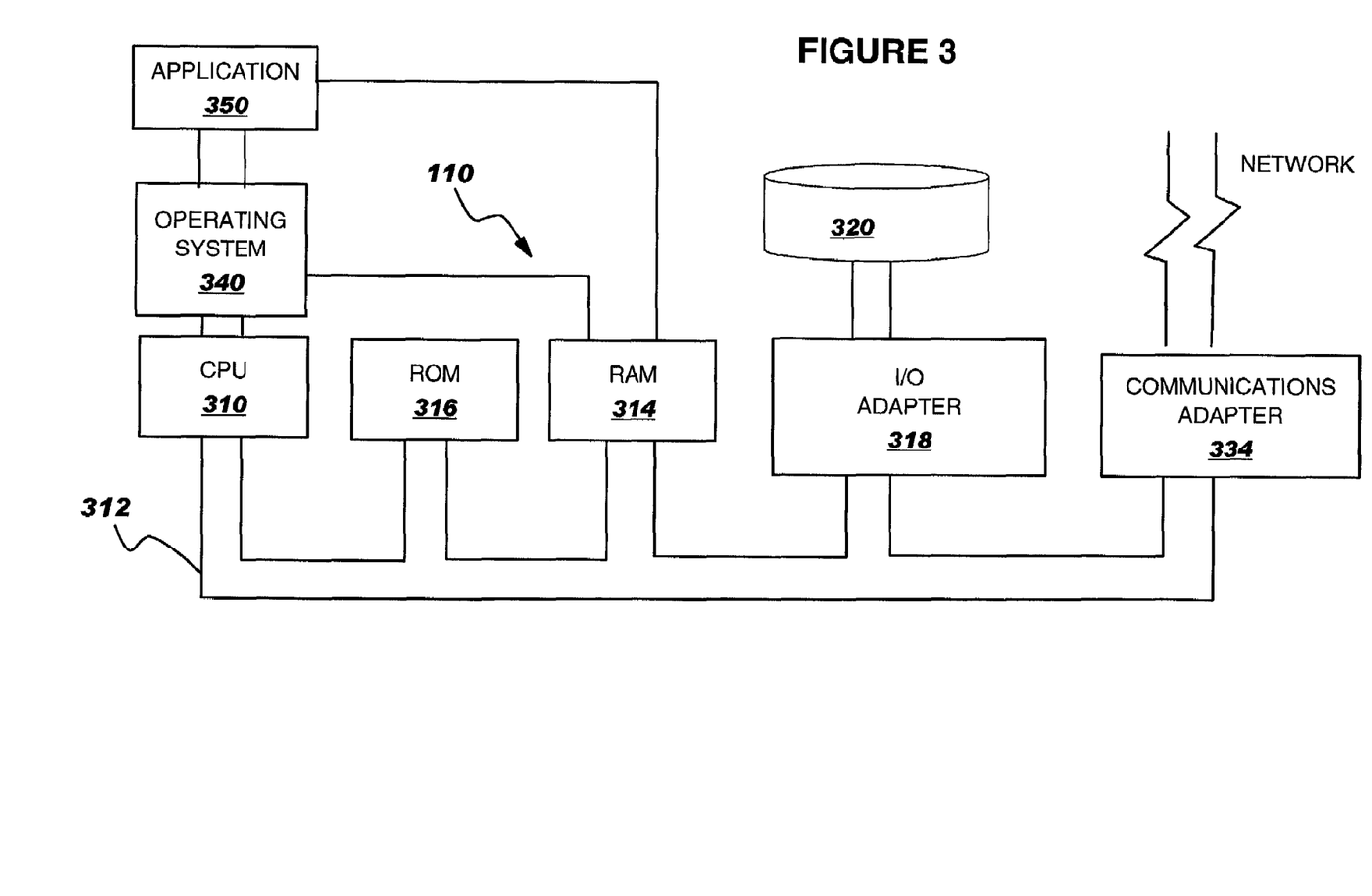
FIG. 3 illustrates an embodiment of the present invention of a server in a network system.

FIG. 3—Hardware Configuration of Server

FIG. 3 illustrates an embodiment of the present invention of server 110. Referring to FIG. 3, server 110 may comprise a central processing unit (CPU) 310 coupled to various other components by system bus 312. An operating system 340, e.g., AIX, UNIX runs on CPU 310 and provides control and coordinates the function of the various components of FIG. 3. Operating system 340 may comprise a security layer for preventing at least in part a hacker from performing unwanted activities such as in server's 110 file system (not shown) even if the hacker procures system administrator status as described in FIGS. 6–7. Application 350, e.g., spreadsheets, word processing, runs in conjunction with operating system 340 which implements the various functions to be performed by application 350. Read only memory (ROM) 316 is coupled to system bus 312 and includes a basic input/output system ("BIOS") that controls certain basic functions of server 110. Random access memory (RAM) 314, disk adapter 318 and communications adapter 334 are also coupled to system bus 312. It should be noted that software components including operating system 340 and application 350 are loaded into RAM 214 which is the computer system's main memory. A description of at least a portion of the memory space of RAM 214 is provided in the description of FIG. 4.

Disk adapter 318 may be a small computer system interface ("SCSI") adapter that communicates with disk units 320, e.g., disk drive. It is noted that the program of the present invention that may prevent at least in part a hacker from performing unwanted activities such as in server's 110 file system (not shown) even if the hacker procures system administrator status as described in FIGS. 6 and 7 may reside in disk unit 320. Communications adapter 334 interconnects bus 312 with network 130 thereby enabling server 110 to communicate with client 120.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by server 110, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
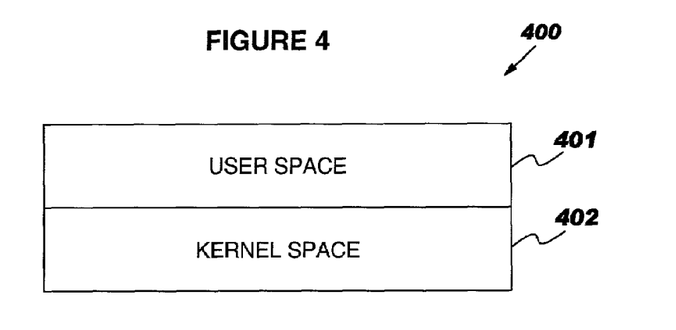
FIG. 4 illustrates a memory space of the server in the network system configured in accordance with the present invention.

FIG. 4—Memory Space of Server

FIG. 4 illustrates an embodiment of a memory space 400 of server 110 configured in accordance with the present invention. Memory space 400 may be logically divided into user space 401 and kernel space 402. User space 401 may refer to that portion of memory space 400 accessible by users. For example, user space 401 may store user applications, e.g., command shells, word processing, spreadsheet. Kernel space 402 may typically store the core portions of the software that performs the most essential operating system tasks, e.g., handling disk input and output operations, managing internal memory. That is, kernel space 402 may refer to operating system 340 that resides in memory at all times and provides the basic services.

Figure 5:
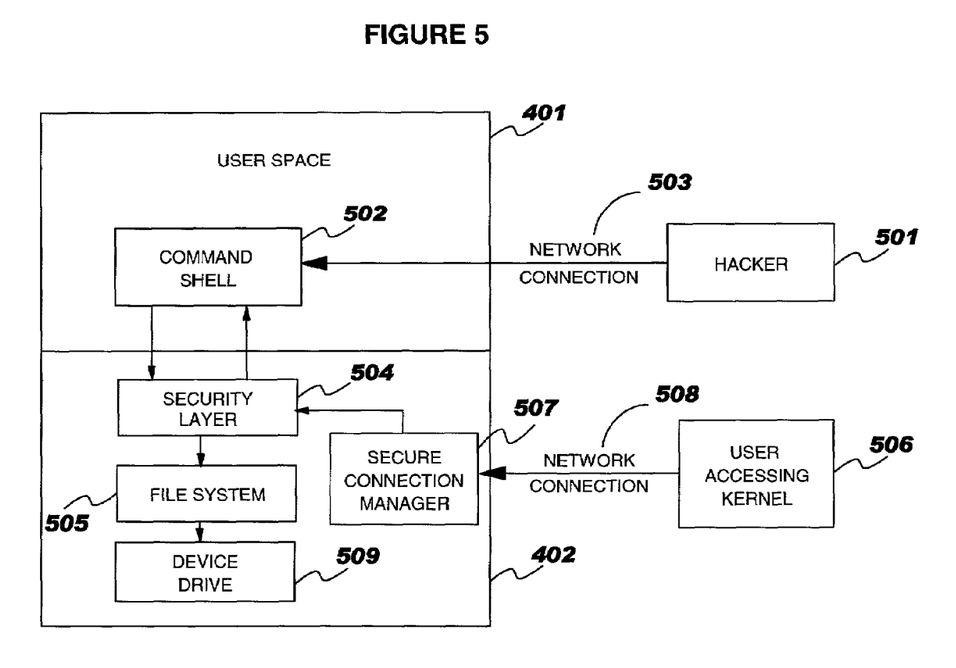
FIG. 5 illustrates an additional security layer in a kernel space for preventing at least in part a hacker from performing unwanted activities in accordance with the present invention.

FIG. 5—Kernel Space with Additional Security Layer

FIG. 5 illustrates an additional security layer 504 in kernel space 402 that may least in part prevent a hacker from performing unwanted activities such as in server 110 even if the hacker procures system administrator status without preventing authorized system administrators from performing authorized activities in accordance with the present invention.

Referring to FIG. 5, a hacker 501 via a client 120 may potentially subvert security systems of server 110 using a security exploit such as a buffer overflow and obtain system administrator status. Upon obtaining system administrator status, hacker 501 may invoke a command shell 502, i.e., a command line interface, by establishing a network connection with user space 401 of server 110 as illustrated by arrow 503. When hacker 501 invokes a command shell 502, hacker 501 may issue a request to kernel space 402 to perform unwanted activities, e.g., erase files, reading files containing credit card numbers, in a file system 505. In accordance with the principles of the present invention, this request may be intercepted by a security layer 504 in kernel space 402 that may analyze the request for validation. If a request is received from user space 401, security layer 504 may then determine whether the analyzed request is a request for unwanted activities, e.g., modify file. If the security layer 504 determines that the request is for permissible activities, e.g., read file, then security layer 504 may transmit the request to file system 505. The request may be serviced by disk driver 509 retrieving the appropriate file(s) from disk unit 320 to perform permissible activities, e.g., read file, by hacker 501. However, if security layer 504 determines that the request is for unwanted activities, e.g., erase files, reading files containing credit card numbers, then security layer 504 may transmit a response to the request issued by hacker 501 rejecting the request as the request was not issued from an authorized user accessing kernel space 402 as described in greater detail below.

Conversely, in accordance with the present inventive principles, a user 506 may establish a secure authorized network connection with secure connection manager 507 in kernel space 402 as indicated by arrow 508. Secure connection manager 507 may be configured to establish a secure authorized connection with user 506, e.g., system administrator, using appropriate encryption and authorization protocols, e.g., Kerberos, provided that user 506 is authorized to establish a network connection with secure connection manager 507. User 506 may then be said to be an authenticated user. It is noted that other encryption and authorization protocols may be used by secure connection manager and would be recognized by an artisan of ordinary skill in the art and that such embodiments employing such protocols would fall within the scope of the present invention. Upon establishing a secure authorized network connection with authenticated user 506, the functions permitted by secure connection manager 507, e.g., modify, replace, erase, files in file system 505, may be exported to authenticated user 506.

Upon authenticated user 506 establishing a secure authorized network connection with secure connection manager 507, authenticated user 506, e.g., system administrator, may issue a request to kernel space 402 to perform activities, e.g., implement ordinary, routine changes, on file system 505. The request may be received by secure connection manager 507 which may then forward the request to security layer 504. As stated above, security layer 504 may analyze the request for validation. If security layer 504 determines that the request is from kernel space 402 where the requester has established a verified authorized secured connection via secure connection manager 507 and the request is permissible for an authorized user, then security layer 504 may transmit the request to file system 505. The request may be serviced by disk driver 509 retrieving the appropriate file(s) from disk unit 320 to be modified, replaced, erased, etc. by authenticated user 506.

Figure 6:
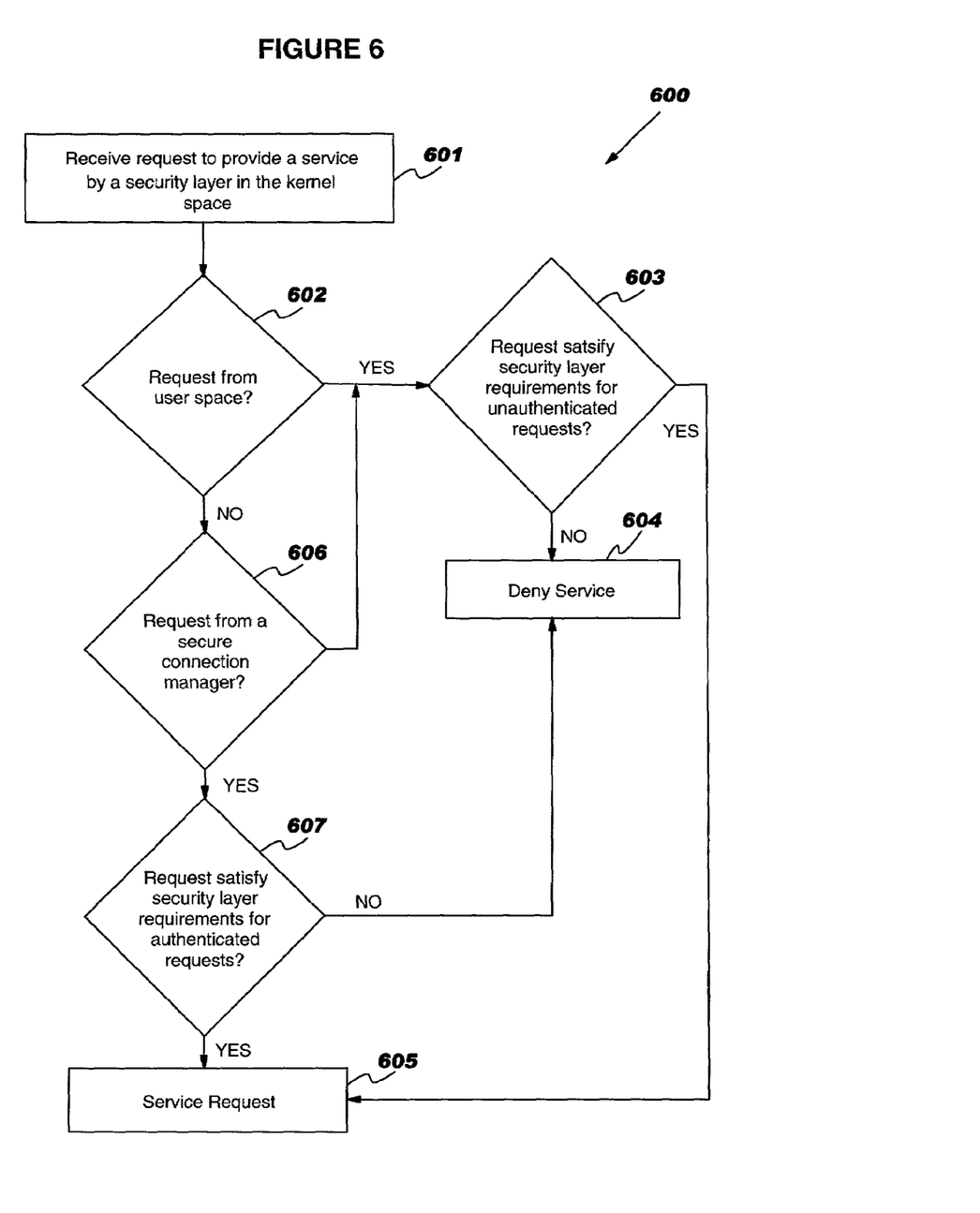
FIG. 6 is a flowchart of a method for preventing ate least in part a hacker from performing unwanted activities in accordance with the present invention.

FIG. 6—Method for Preventing at Least in Part a Hacker from Performing Unwanted Activities FIG. 6 illustrates a flowchart of one embodiment of the present invention of a method 600 for preventing at least in part a hacker from performing unwanted activities such as in server 110 even if the hacker procures system administrator status without preventing authorized system administrators from performing authorized activities. As stated in the Background Information section, an implementation for preventing a hacker from obtaining system administrator status and performing unwanted activities by accessing the user space in a computer is by an interface called capabilities that allows certain capabilities of the operating system capabilities to be deactivated. The capability that is deactivated may not be activated except by rebooting the system. For example, the interface may render the file system containing web pages read-only thereby preventing the hacker from performing unwanted activities on the file system. However, even authorized system administrators will not be able to implement ordinary, routine changes unless the system is rebooted thereby causing unacceptable system downtime. It would therefore be desirable to prevent at least in part a hacker from performing unwanted activities such as in a computer's file system even if the hacker procures system administrator status without preventing authorized system administrators from performing authorized activities. Method 600 is a method for preventing at least in part a hacker from performing unwanted activities such as in server 110 even if the hacker procures system administrator status without preventing authorized system administrators from performing authorized activities.

In step 601, security layer 504 may receive a request to provide a service, e.g., erase files, reading files containing credit card numbers, read file, modify file, from a user of client 120. As stated above, a hacker 501 may somehow subvert security systems of server 101 and obtain system administrator status. Upon obtaining system administrator status, hacker 501 may invoke a command shell 502 from an application in user space 502. When hacker 501 invokes a command shell, hacker 501 may issue a request to kernel space 402, i.e., security layer 504 of kernel space 402, to provide a service. Furthermore, as stated above, security layer 504 may also receive a request from user 506 that accessed kernel space 402. If user 506 is an authorized user then a secure authorized network connection may be established between secure connection manager 507 and user 506. User 506 may then be said to be an authenticated user. Authenticated user 506 may transmit a request to provide a service to kernel space 402, i.e., secure connection manager 507 of kernel space 402. Secure connection manager 507 may then forward the request to security layer 504.

In step 602, security layer 504 may determine whether the request received in step 601 was from user space 401 or from kernel space 402. If the request was received from user space 401, then the user is an unauthenticated user. That is, the user may be a potential hacker. Subsequently, security layer 504 may determine whether the request satisfies requirements for unauthenticated requests, i.e., requests from an unauthenticated user, in step 603. In one embodiment, security layer 504 may be initialized with security requirements for unauthenticated requests as well as authenticated requests as illustrated in FIG. 7.

Figure 7:
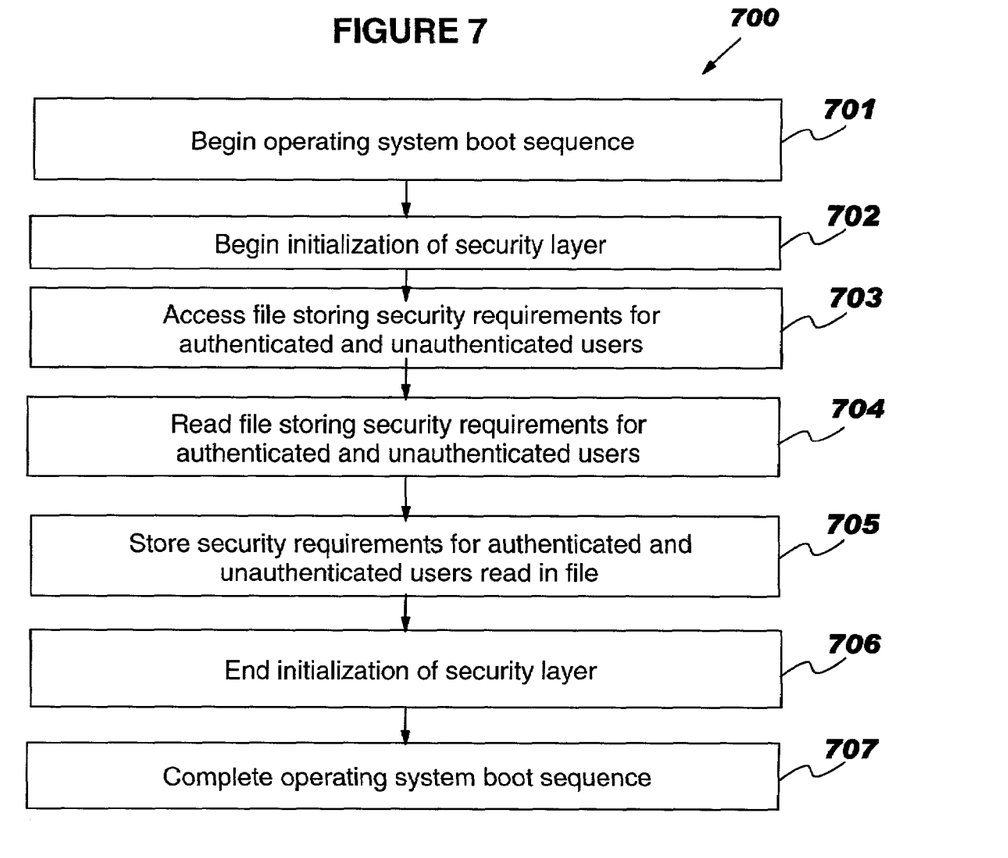
FIG. 7 is a flowchart of a method for initializing the security layer with requirements for unauthenticated requests as well as authenticated requests in accordance with the present invention.

Referring to FIG. 7, FIG. 7 is a flowchart of a method 700 for initializing security layer 504 with security requirements for unauthenticated requests as well as authenticated requests in accordance with the present invention. In step 701, operating system 340 (FIG. 3) begins a boot sequence when server 110 is initially turned on. In step 702, security layer 504 may being initialization during the boot sequence. In step 703, security layer 504 may access a file storing security requirements for authenticated and unauthenticated users. In one embodiment, the file storing security requirements for authenticated and unauthenticated users may reside in disk unit 320. Upon accessing the file storing security requirements for authenticated and unauthenticated users, security layer 504 may read the security requirements for authenticated and unauthenticated users in step 704. In step 705, the security requirements read may be stored in memory, e.g., RAM 312. In step 706, the initialization of security layer 504 may terminate. In step 707, operating system 340 may complete the boot sequence.

Referring to step 603 of FIG. 6, if the request does not satisfy requirements for unauthenticated requests, i.e., requests from an unauthenticated user, then security layer 504 does not service the request in step 604. For example, the unauthenticated user may request to perform unwanted activities, e.g., erase files, reading files containing credit card numbers, such as in a file system. Since the user is unauthenticated, the user's request may not be serviced. Instead of servicing the request, security layer 504 may transmit a response to the user notifying the user that the request is denied.

Conversely in step 603, if the request satisfies requirements for unauthenticated requests, i.e., requests from an unauthenticated user, then security layer 504 services the request in step 605. For example, security layer 504 may service a request to read a particular file from an unauthenticated user when the security requirements for unauthenticated users permit read-only access to files.

Returning to step 602, if the request was received from kernel space 402, then security layer 504 may determine whether the request was transmitted from secure connection manager 507 in step 606. If the request was not transmitted from secure connection manager 507 then security layer 504 may determine whether the request satisfies requirements for unauthenticated requests, i.e., requests from an unauthenticated user, in step 603.

If the request was transmitted from secure connection manager 507 then security layer 504 may determine whether the request satisfies requirements for authenticated requests, i.e., requests from an authenticated user, in step 607. If the request was received from secure connection manager 507, then the user of client 120 that issued the request is an authenticated user.

If the request does not satisfy requirements for authenticated requests, i.e., requests from an authenticated user, then security layer 504 does not service the request in step 604. For example, the authenticated user may request to perform an activity, e.g., reading files containing credit card numbers, that no user has permission to perform. Subsequently, the user's request may not be serviced. Security layer 504 may instead transmit a response to the user denying the request.

Referring to step 607, if the request satisfies requirements for authenticated requests, i.e., requests from an authenticated user, then security layer 504 services the request in step 605. The authenticated user, e.g., system administrator, may then be able to perform ordinary, routine changes such as in a file system while unauthenticated users, e.g., hackers, are at least in part prevented from performing unwanted activities such as in a file system in server 110.

It is noted that methods 600 and 700 may be executed in a different order presented and that the order presented in the discussion of FIGS. 6 and 7 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for preventing a hacker from performing unwanted activities in a computer system comprising the steps of:
   receiving a request to provide a service from a user;
   determining if said request was transmitted from a user space or a kernel space of a memory space of said computer system, wherein if said request was transmitted from said user space then said user is an unauthenticated user; and
   determining if said request from said unauthenticated user fails to satisfy a security requirement for unauthenticated requests, wherein if said request from said unauthenticated user fails to satisfy said security requirement for unauthenticated requests then said request is not serviced.

2. The method as recited in claim 1, wherein if said request from said unauthenticated user does not fail to satisfy said security requirement for said unauthenticated requests then said request is serviced.

3. The method as recited in claim 1, wherein if said request was from said kernel space then the method further comprises the step of:
   determining whether said request was transmitted from a manager in said kernel space configured to establish a secure authorized connection between said user and said kernel space if said user is authorized.

4. The method as recited in claim 3, wherein if said request was not transmitted from said manager then said user is said unauthenticated user, wherein the method further comprises the step of:
   determining whether said request satisfies said security requirement for unauthenticated requests.

5. The method as recited in claim 4, wherein if said request satisfies said security requirement for unauthenticated requests then said request is serviced.

6. The method as recited in claim 4, wherein if said request does not satisfy said security requirement for unauthenticated requests then said request is not serviced.

7. The method as recited in claim 3, wherein if said request was transmitted from said manager then said user is an authenticated user, wherein the method further comprises the step of:
   determining whether said request satisfies a security requirement for authenticated requests.

8. The method as recited in claim 7, wherein if said request does not satisfy said security requirement for authenticated requests then said request is not serviced.

9. The method as recited in claim 7, wherein if said request satisfies said security requirement for authenticated requests then said request is serviced.

10. A computer program product having a computer readable medium having computer program logic recorded thereon for preventing a hacker from performing unwanted activities in a computer system, comprising:
    programming operable for receiving a request to provide a service from a user;
    programming operable for determining if said request was transmitted from a user space or a kernel space of a memory space of said computer system, wherein if said request was transmitted from said user space then said user is an unauthenticated user; and
    programming operable for determining if said request from said unauthenticated user fails to satisfy a security requirement for unauthenticated requests, wherein if said request from said unauthenticated user fails to satisfy said security requirement for unauthenticated requests then said request is not serviced.

11. The computer program product as recited in claim 10, wherein if said request from said unauthenticated user does not fail to satisfy said security requirement for said unauthenticated requests then said request is serviced.

12. The computer program product as recited in claim 10, wherein if said request was from said kernel space then the computer program product further comprises:
    programming operable for determining whether said request was transmitted from a manager in said kernel space configured to establish a secure authorized connection between said user and said kernel space if said user is authorized.

13. The computer program product as recited in claim 12, wherein if said request was not transmitted from said manager then said user is said unauthenticated user, wherein the computer program product further comprises:
    programming operable for determining whether said request satisfies said security requirement for unauthenticated requests.

14. The computer program product as recited in claim 13, wherein if said request does not satisfy said security requirement for unauthenticated requests then said request is not serviced.

15. The computer program product as recited in claim 13, wherein if said request satisfies said security requirement for unauthenticated requests then said request is serviced.

16. The computer program product as recited in claim 12, wherein if said request was transmitted from said manager then said user is an authenticated user, wherein the computer program product further comprises:

programming operable for determining whether said request satisfies a security requirement for authenticated requests.

17. The computer program product as recited in claim 16, wherein if said request does not satisfy said security requirement for authenticated requests then said request is not serviced.

18. The computer program product as recited in claim 16, wherein if said request satisfies said security requirement for authenticated requests then said request is serviced.

19. A system, comprising:
   a processor;
   a memory unit storing a computer program operable for preventing a hacker from performing unwanted activities in said system; and
   a bus system coupling the processor to the memory unit, wherein the computer program is operable for performing the following programming steps:
      receiving a request to provide a service from a user;
      determining if said request was transmitted from a user space or a kernel space of a memory space of said system, wherein if said request was transmitted from said user space then said user is an unauthenticated user; and
      determining if said request from said unauthenticated user fails to satisfy a security requirement for unauthenticated requests, wherein if said request from said unauthenticated user fails to satisfy said security requirement for unauthenticated requests then said request is not serviced.

20. The system as recited in claim 19, wherein if said request from said unauthenticated user does not fail to satisfy said security requirement for said unauthenticated requests then said request is serviced.

21. The system as recited in claim 19, wherein if said request was from said kernel space then the computer program is further operable for performing the following programming step:
   determining whether said request was transmitted from a manager in said kernel space configured to establish a secure authorized connection between said user and said kernel space if said user is authorized.

22. The system as recited in claim 21, wherein if said request was not transmitted from said manager then said user is said unauthenticated user, wherein the computer program is further operable for performing the following programming step:
   determining whether said request satisfies said security requirement for unauthenticated requests.

23. The system as recited in claim 22, wherein if said request does not satisfy said security requirement for unauthenticated requests then said request is not serviced.

24. The system as recited in claim 22, wherein if said request satisfies said security requirement for unauthenticated requests then said request is serviced.

25. The system as recited in claim 21, wherein if said request was transmitted from said manager then said user is an authenticated user, wherein the computer program is further operable for performing the following programming step:
   determining whether said request satisfies a security requirement for authenticated requests.

26. The system as recited in claim 25, wherein if said request does not satisfy said security requirement for authenticated requests then said request is not serviced.

27. The system as recited in claim 25, wherein if said request satisfies said security requirement for authenticated requests then said request is serviced.

* * * * *